United States Patent [19]

McCarty et al.

[11] Patent Number: 5,307,619
[45] Date of Patent: May 3, 1994

[54] AUTOMATIC NOX CONTROL FOR A GAS TURBINE

[75] Inventors: William L. McCarty, West Chester, Pa.; Achim A. Von Seelen, Winter Park, Fla.

[73] Assignee: Westinghouse Electric Corp., Pittsburgh, Pa.

[21] Appl. No.: 945,080

[22] Filed: Sep. 15, 1992

[51] Int. Cl.$^5$ ............................................... F02C 3/30
[52] U.S. Cl. ..................................... 60/39.05; 60/39.3
[58] Field of Search ................... 60/39.05, 39.3, 39.5, 60/39.53, 39.55

[56] References Cited

U.S. PATENT DOCUMENTS

| | | | |
|---|---|---|---|
| 4,160,362 | 7/1979 | Martens et al. | 60/39.18 |
| 4,733,527 | 3/1988 | Kidd | 60/39.3 |

FOREIGN PATENT DOCUMENTS

| | | | |
|---|---|---|---|
| 9911 | 1/1978 | Japan | 60/39.5 |
| 325 | 1/1989 | Japan | 60/39.3 |

Primary Examiner—Louis J. Casaregola
Attorney, Agent, or Firm—G. R. Jarosik

[57] ABSTRACT

A gas turbine power plant has coolant injected into the combustors in order to reduce the level of nitrogen oxide produced by the combustion of natural gas fuel and/or oil. A control system controls injection of coolant into the combustors in order to reduce NOx emissions, while improving turbine cycle efficiency and avoiding the possibility of over-injection of coolant to the point of flame-out in the combustor. PID controllers are used to provide percentage error bias in the control system, whereby adjustment of coolant injection follows turbine load in a manner that increases turbine efficiency.

14 Claims, 5 Drawing Sheets

AUTOMATIC NOX CONTROL FOR A GAS TURBINE

FIELD OF THE INVENTION

This invention relates generally to power plants having one or more gas turbines, and more particularly to a system for automatic control of the injection of coolant into the combustors of the gas turbine in order to reduce NOx emissions produced during the combustion process.

BACKGROUND OF THE INVENTION

The combustion of natural gas fuels and oil in the combustor of a gas turbine power plant is known to produce undesirable levels of nitrogen oxide emissions. In order to reduce the level of NOx emissions, coolant, such as steam or water, is injected into the combustor. As is commonly known, steam or water which is injected into a combustor reduces the temperature of natural gas fuel and oil as it combusts and burns and, as a result, the combustion process produces less NOx.

Systems are known, such as that disclosed in Martens et al, U.S. Pat. No. 4,160,362, for controlling the flow of steam and water into a combustor in order to reduce the emissions of NOx in the gas turbine exhaust. Martens recognizes the problem that over-injection of steam or water, beyond that which is necessary to achieve a desired level of NOx emissions, results in an unnecessary increase in mass flow throughout the turbine and decreases the cycle efficiency. Therefore, it is desirable to properly limit the flow of coolant into the combustors, without sacrificing the necessary reductions in NOx emissions, in order to run the power plant at high efficiency.

Generally, sensors are located in the turbine exhaust stack for measuring the amount of NOx produced. It is desirable to use the output of the NOx sensor as a parameter for input into the control systems employed to control the flow of steam and water into the combustor. However, sensors are unreliable due to the fact that in some circumstances they completely fail to operate.

Thus, in order to account for the unreliability of the NOx sensors, steam or water flow into the combustor is scheduled as a function of the turbine load. This function, known as a standard load versus flow curve, is determined from emissions tests actually conducted on the operational unit, or one similar. During field testing, based on a predetermined NOx set point, the flow rate of steam or water which actually produces NOx emissions at the desired NOx set point is plotted as a function of the turbine load. Accordingly, during actual operating conditions, the steam flow set point which is necessary to produce a desired set point level of NOx emissions at a specific turbine load is determined from the standard load versus flow curve. The parameters from this curve can then be used in a system for controlling the flow of coolant into the combustor.

However, changes in environmental conditions, i.e. ambient temperature in the area of the combustor, as well as the turbine operating conditions, such as the position of the inlet guide vanes, affect this standard load versus flow curve. These variables influence the amount of steam flow which is actually necessary to produce a desired NOx emissions level. Since these variables are not taken into account when the standard load versus flow curve is generated, this curve has a certain amount of error built into it. In order to account for this error, the actual NOx level measured by the sensor is used as a parameter in the control system to adjust the standard curve. However, as discussed below, this adjustment may be limited due to the fact that sensors are known to fail completely under some conditions.

During actual operating conditions at a specific turbine load, in order to produce the desired set point level of NOx, the steam flow set point is determined from the standard load versus flow curve. At the start of the control cycle, valves inject steam or water into the turbine combustors at this set point flow rate. However, due to the error in the standard curve, the actual level of NOx produced and measured by the sensor will most likely vary from the NOx set point. Thus, the control system must account for this error such that the valves inject more or less steam, as compared to the steam flow set point, to bring the NOx level measured by the sensor to the NOx set point.

Devices are known which may be used in coolant injection control systems for measuring the error attributable to the variable conditions associated with the standard load versus flow curve. One such device is a summer as disclosed in Martens. The measured error is used to adjust the steam flow set point derived from the standard load versus flow curve, in order to account for the variables which affect that curve.

For example, FIG. 1 shows an adjusted standard load versus flow curve representative of that which would be produced using a summing device in accordance with the prior art. The dashed lines represent the adjusted steam flow set points. As can be seen, summing devices provide the error in a discrete amount, wherein the magnitude of the error is the same at all points on the curve. Thus, such a device provides for straight line bias of the control system.

However, a problem has been recognized in that the use of devices which provide for straight line bias control in coolant injection systems is inefficient in some circumstances and may damage the gas turbine. As shown in FIG. 1, where a control system employs straight line bias control devices, the amount of error which the system measures, and thus the range of error within which the system operates, is the same when the turbine is at low load as it is when it is at high load. Thus, where the measured NOx level exceeds the NOx set point, the adjustment above the steam flow set point in order to account for the error will be the same, whether operating at high load or low turbine load. At high turbine load, the additional amount of steam flow may be only a small percentage increase above the steam flow set point. However, at low turbine loads, the additional amount of steam flow may be a large percentage increase above the relatively low steam flow set point. Where the control system responds to such an increase at low load conditions, the valves inject coolant at a level which may be beyond that which is necessary to reduce the amount of NOx emissions, thus reducing the turbine cycle efficiency. It is also possible that the over-injection of coolant may result in flameout of the combustor, resulting in malfunctioning of the turbine and possible damage.

The problem created by the use of straight line bias control devices in the fluid injection system is compounded in the case where more than one gas turbine is connected to a single emissions stack, where the stack has only one NOx sensor for the plurality of gas turbines. For example, where two gas turbines are connected to a single stack, during start-up conditions where it is common for both turbines to be on line with only one turbine having steam injection at the time, the unit with steam injection in operation will be adjusting its steam flow based upon a combined NOx level from both units and the possibility of over-injection is increased. Also, where two gas turbines are connected to a single stack and both are on line, but each is operating at a different load, straight line bias of the control system, using a summation of the control variables, results in fighting between the units.

Therefore, there is a need for a system for automatic control of the flow of coolant into the combustors of a gas turbine power plant in order to reduce NOx emissions levels, wherein the control system employs devices which provide for a percentage bias of the system parameters. The present invention provides a system which satisfies this need.

SUMMARY OF THE INVENTION

In a gas turbine power plant having at least one gas turbine, where the gas turbine has at least one combustor burning natural gas fuel and/or oil, a system and method for controlling the flow of coolant injected into each combustor, the method comprising generating a signal indicative of the percent error between a predetermined NOx emissions set point and the measured amount of NOx emissions produced by the power plant. This signal is used to adjust a predetermined coolant flow set point in order to account for the error built into the standard load versus flow curve. A second signal is generated which is indicative of the percent error between the adjusted coolant flow set point and the measured amount of coolant flow injected by the coolant injection throttle valves. The flow of coolant through the throttle valves and into the combustor is controlled in accordance with this second signal. PID controllers are used to generate the percent error signal between the input parameters. The adjustment to the coolant flow set point may be limited so as to avoid over-injection of coolant into the combustors. This invention is particularly suited for use in a power plant where only NOx sensor is used in the control system for injecting coolant into two or more gas turbines.

DETAILED DESCRIPTION OF THE PREFERRED EMBODIMENTS

Figure 2:
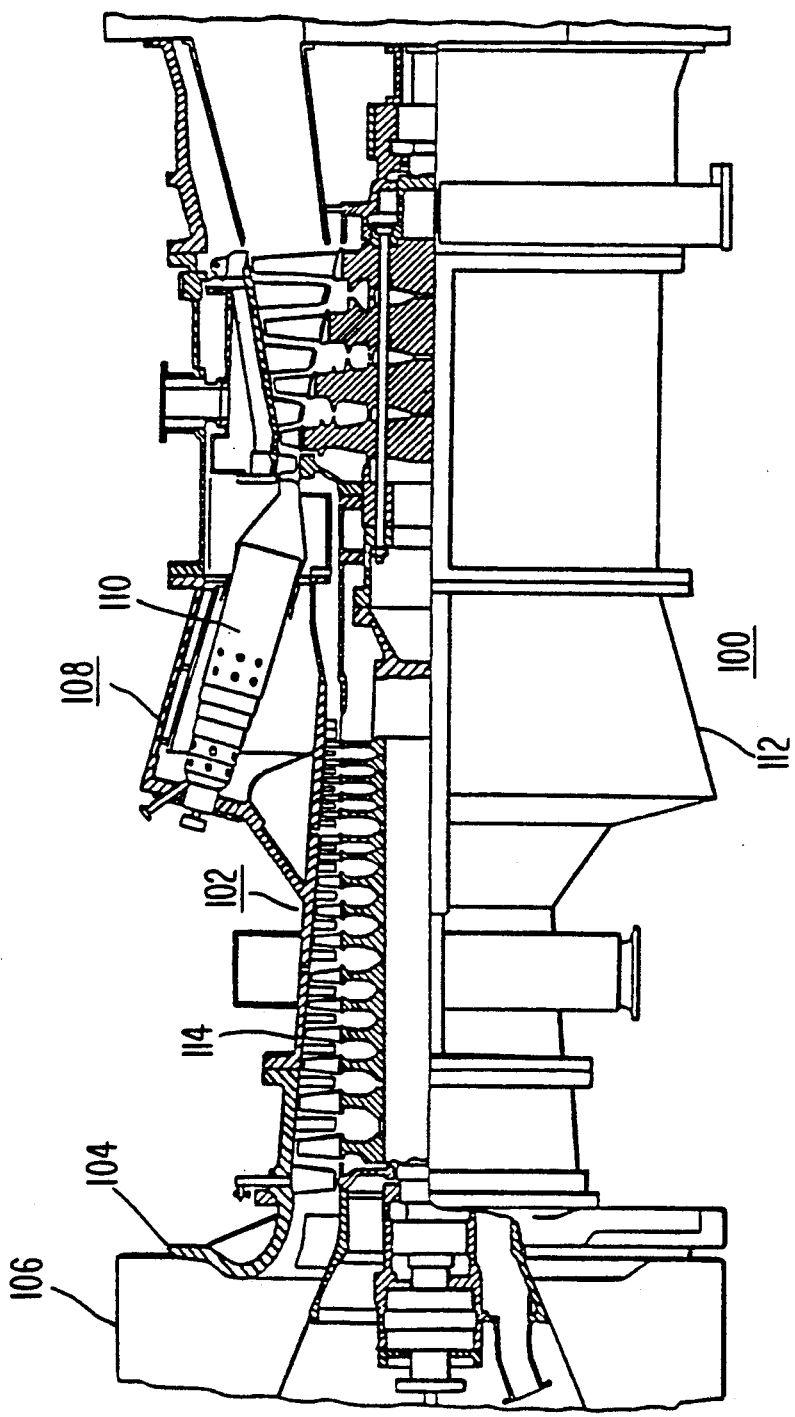
FIG. 2 shows a front elevational view of an industrial gas turbine employed in power plant equipment arranged to operate in accordance with the present invention.

Combustion or gas turbine 100 constructed and arranged in accordance with the present invention is shown in FIG. 2. In the embodiment described herein, gas turbine 100 is preferably the W 501D5 type manufactured by Westinghouse Electric Corporation and is a simple cycle type having a rated speed of 3600 rpm. As will be apparent from the drawing, turbine 100 includes a two bearing single shaft construction, cold-end power drive and axial exhaust. Filtered inlet air enters multistage axial flow compressor 102 through flanged inlet manifold 104 from inlet ductwork 106. Pressurized compressor outlet air is directed into a combustion system 108 comprising a total of fourteen can-annular combustors 110 conically mounted within a section 112 of casing 114 about the longitudinal axis of the gas turbine 100.

Control of NOx emissions produced during the combustion of natural gas fuel and/or oil in combustor 110 is achieved by injecting coolant into combustor 110. In a preferred embodiment of the present invention, the coolant injected into combustor 110 is steam. In another embodiment, the coolant is water, and in a further embodiment the coolant is a mixture of steam and water.

Figure 1:
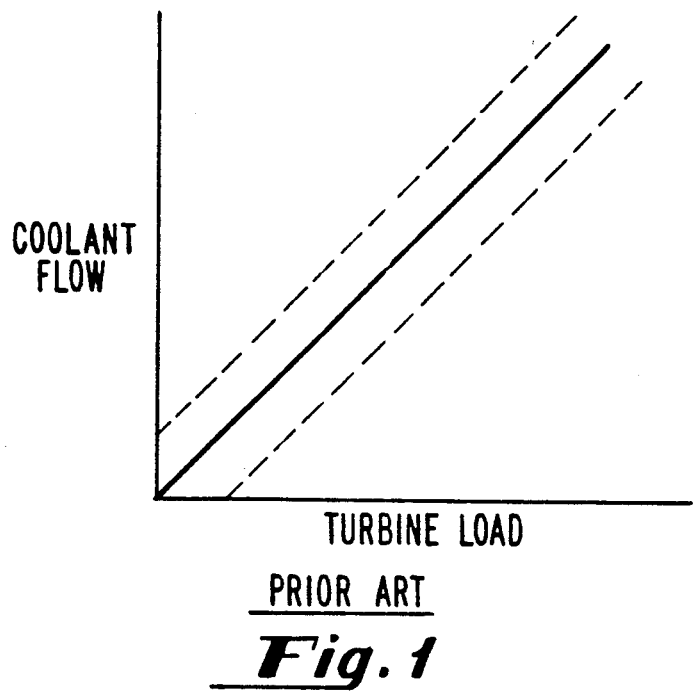
FIG. 1 shows a standard load versus flow curve representative of an error adjustment in accordance with prior art control systems.
Figure 3:
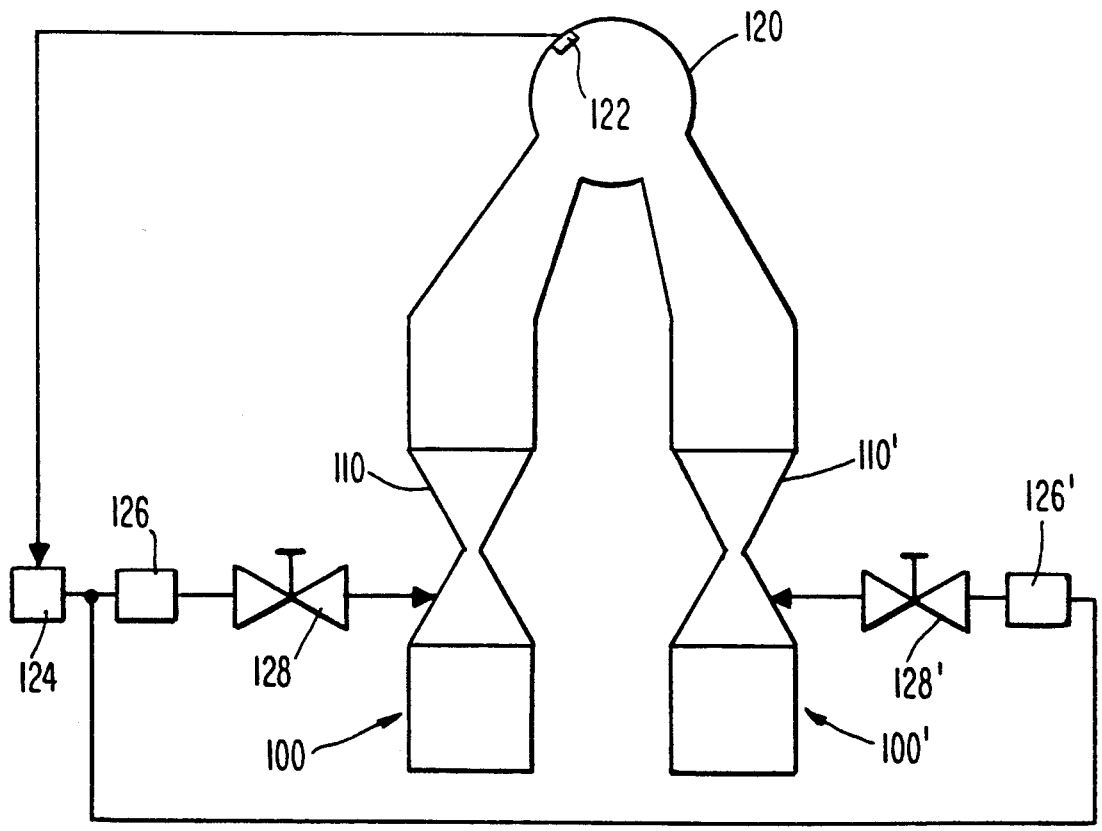
FIG. 3 shows a schematic representation of an overhead plan view of structure embodied in a system in accordance with the present invention.

FIG. 3 shows a schematic representation of an overhead plan view of structure embodied in a system in accordance with the present invention. In a preferred embodiment, two gas turbines 100, 100' are connected to a single exhaust emissions stack 120. Stack 120 contains one sensor 122 for measuring the combined level of NOx emissions produced by both turbines. Controller 124 measures the percent error between a predetermined NOx set point and the combined NOx emissions produced at sensor 122 by turbines 100, 100'. The output of controller 124 is used to adjust a predetermined coolant flow set point for each turbine 100, 100'. The adjusted coolant flow set point is input into a second controller 126, 126' for each turbine, along with the actual measured amount of coolant flow injected into each combustor 110, 110' by throttle valves 128, 128'. Controllers 126, 126' measure the percent error between the adjusted coolant flow set point and the actual measured amount of coolant flow. The percent error output of controllers 126, 126' is used to control the injection of coolant into combustors 110, 110' from throttle valves 128, 128' in order to maintain the NOx emissions levels at the desired NOx set point.

In a preferred embodiment, controller 124 and controllers 126, 126' are proportional integral and derivative, or PID, controllers. A PID controller recognizes any deviation between two input parameters and integrates the deviation between the two parameters to zero. As is commonly known, PID controllers operate within a range of error while integrating. The output signal of the controller travels over this range, either plus or minus, in order to try to bring the deviation between the two input parameters to zero. In accordance with the present invention, the PID controller operates within a range of error which is expressed as a percentage, either plus or minus, and the output signal represents a percent error. Thus, when the deviation between the two input parameters reads zero, the PID is satisfied and the output signal will be zero percent error. Accordingly, the control system bias is based on a percentage, rather than straight line bias control.

In accordance with the present invention, the range of the percent error of the PID controller is variable. At higher ranges, the output signal of the PID controller provides for larger adjustment of the coolant flow set point. In a preferred embodiment, PID controller 124 and controllers 126, 126' have a range of percent error between about −100% and +100%.

Figure 4:
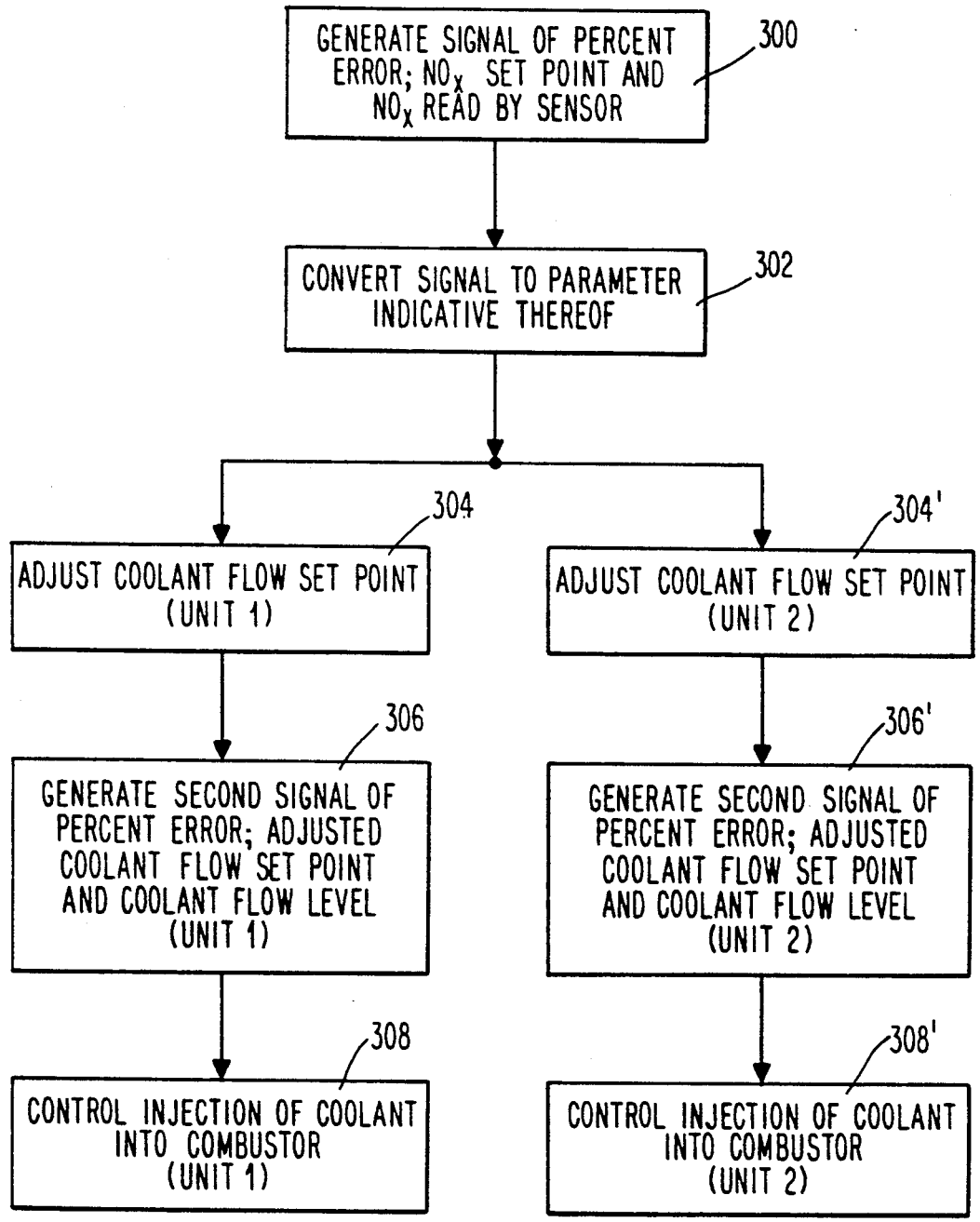
FIG. 4 shows a flow diagram for a method in accordance with the present invention for operation of the structure shown in FIG. 3.

FIG. 4 shows a flow chart for a method for controlling the coolant flow into combustors 110, 110' in order to control the amount of NOx produced by gas turbines 100 100', for the embodiment shown in FIG. 3. At 300, a signal is generated by controller 124 which represents the percent error between a predetermined NOx emissions set point and the measured amount of NOx emissions produced by the power plant and measured at sensor 122. The signal generated at 300 is converted to a parameter indicative of that signal at 302. At 304, 304' the output at 302 is used to adjust the coolant flow set point of each gas turbine 100, 100' and a second parameter indicative of the adjusted coolant flow set point is produced. Accordingly, the output signal at 302 provides the same percentage adjustment in the coolant flow set point for both turbines 100, 100'.

At 306, 306' a second signal is generated by controllers 126, 126' which represents the percent error between the adjusted coolant flow set point parameter and the measured amount of coolant flow, for each gas turbine 100, 100'. At 308, 308' the flow of coolant through injection throttle valves 128, 128' and into combustors 110, 110' is controlled in accordance with the signals from 306, 306'.

Figure 5:
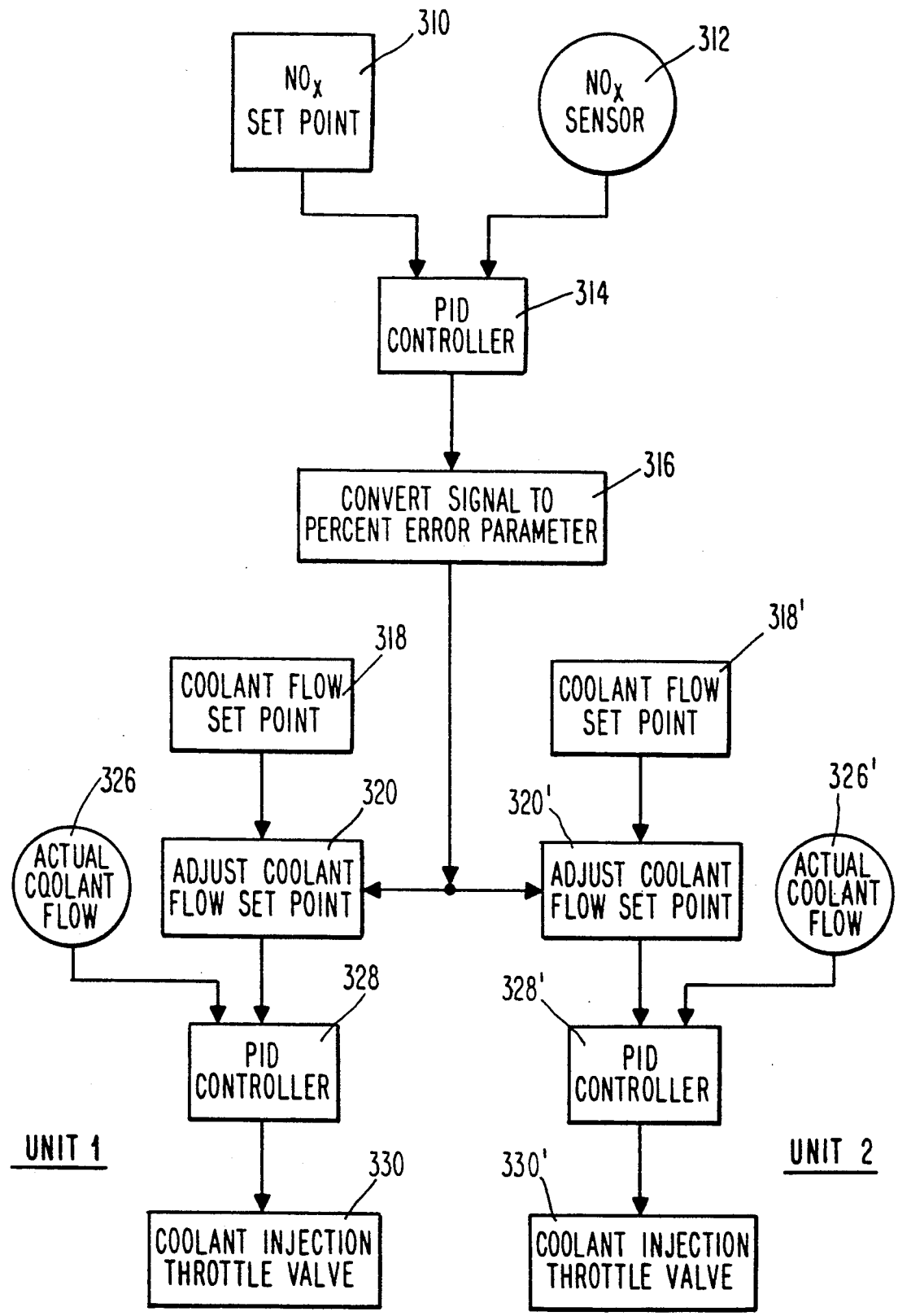
FIG. 5 shows a flow diagram for a method of practicing the invention.

Referring to FIG. 5, in order to generate the percent error between the NOx set point and the measured amount of NOx, the NOx set point is operator entered into the system at 310. The NOx set point is predetermined based upon government environmental pollution control standards. The actual combined level of NOx produced by both turbines 100, 100' is measured by sensor 122 in exhaust stack 120 at 312. The output parameters at 310 and 312 are input into a PID controller at 314. The percent error signal output from the PID controller at 314 is converted to a parameter indicative of this percent error at 316. Where the actual level of NOx measured at 312 is greater than the NOx set point at 310, the output of the PID controller at 314 will be a percent error which is positive. Accordingly, where the measured NOx level is less than the set point, the percent error will be negative.

Figure 6:
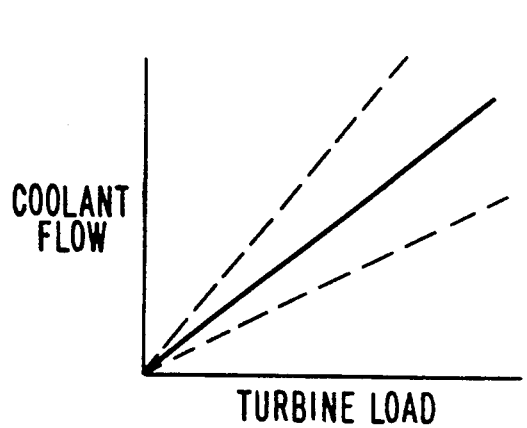
FIG. 6 shows a standard load versus flow curve representative of an error adjustment in accordance with the present invention.

The coolant flow set point for each turbine 100, 100', which is determined from the standard load versus flow curve and is based upon the turbine load and the desired NOx set point level, is read into the system at 318, 318'. The percent error parameter output at 316 is used to adjust the coolant flow set point from 318, 318' in order to account for the error built into the load versus flow curve. At 320, 320' the coolant flow set point is adjusted by multiplying the percent error output from 316 by the coolant flow set point from 318, 318' to arrive at the adjusted coolant flow set point. Where the percent error output from the PID controller at 314 is positive, the adjustment to the coolant flow set point will be a percentage increase in that set point, and a negative percent error results in a decrease in the coolant flow set point. FIG. 6 shows an adjusted load versus flow set point curve in accordance with the present invention. The dashed lines represent the range of error within which the system operates, based upon the adjusted coolant flow set point at 320 or 320'. As shown, the magnitude of the error adjustment at low turbine loads is small, compared with that at high turbine loads. Thus, the possibility of over-injection of coolant at low loads is decreased, as compared to straight line bias control systems. Where two units are in operation at different loads, each unit will contribute by the same percentage to the reduction of NOx emissions levels. Also, the cycle efficiency, considering the increased mass flow caused by the addition of coolant, is maximized over the entire load capability of the turbine, while the necessary reductions in NOx emissions are provided for.

Figure 8:
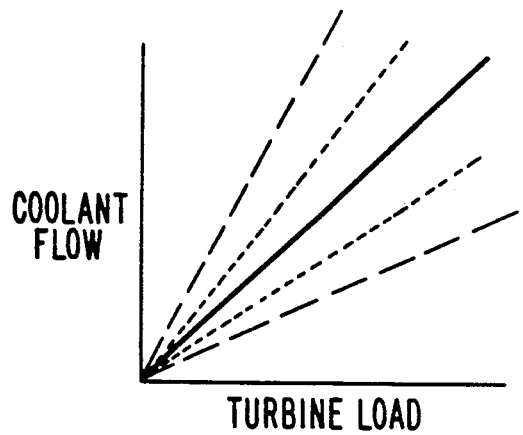
FIG. 8 shows another standard load versus flow curve representative of an error adjustment in accordance with the present invention.
Figure 7:
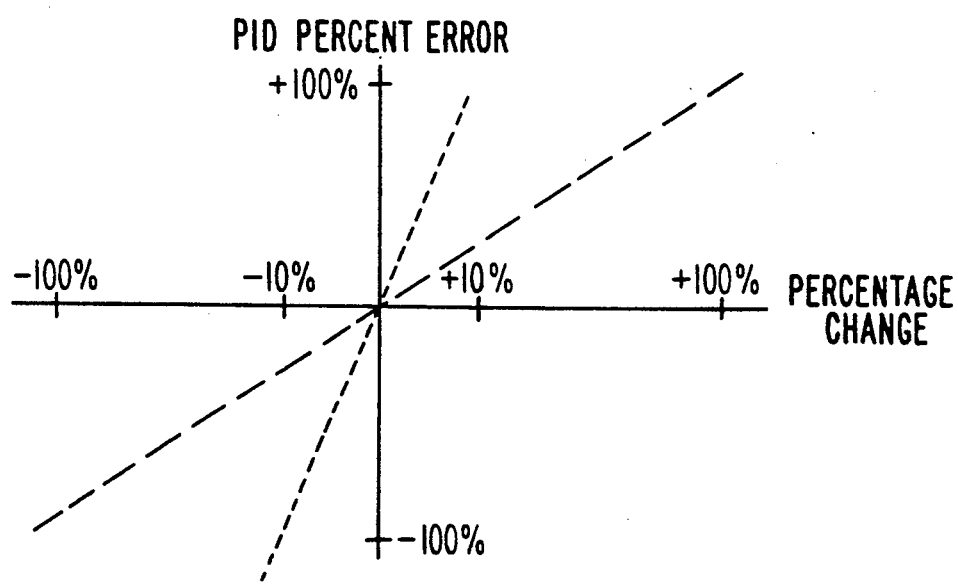
FIG. 7 shows a plot of control parameters in accordance with the present invention.

The adjustment to the coolant flow set point at 320, 320' may be limited to ensure that coolant is not over-injected into the combustors in the case of complete failure of an NOx sensor, possibly to the point of flame-out in the combustor. A percentage change in the coolant flow set point is predetermined. This predetermined percentage change represents the maximum adjustment to the coolant flow set point at the maximum percent error output of the PID controller. FIGS. 7 and 8 illustrate the effect of such a limitation. Assume, for example, that the PID controller has a range between −100% to +100% error. Without any limitation on the adjustment, a percent error of +100% which is read from the PID controller at 314 amounts to an adjustment, or increase, in the coolant flow set point of 100% of that set point. Accordingly, a linear relationship between the two parameters is formed, as shown by the dashed lines in FIG. 7. With a limitation, assuming that the adjustment to the coolant flow set point is limited to a percentage change of ±10%, a percent error of +100% which is read from the PID controller at 314 amounts to an adjustment, or increase, in the coolant flow set point of 10% of that set point. Once again, a linear relationship between the two parameters is formed, as shown by the dotted lines in FIG. 7. The effect of such a limitation is shown by the standard load versus flow curve in FIG. 8. As shown by the dotted lines, the adjustment to the coolant flow set point is limited to the range of the predetermined percentage change in the coolant flow set point and is less than the adjustment without a limitation.

The magnitude of the percentage change in the coolant flow set point is variable and is selected to limit the amount of coolant flow in order to avoid over-spraying in the combustor. In a preferred embodiment, the percentage change in the coolant flow set point is ±10%. This assures that the maximum amount of steam flow can be 10% above the steam flow set point, thus preventing the possibility of over-spraying to the point of a flame out, while also insuring that emissions are well within acceptable levels when steam injection is in operation. Other magnitudes for the percentage change are within the scope of this invention and the value may be selected based upon the accuracy of the standard load versus flow curve.

At 326, 326' the actual flow level of coolant which is injected into combustors 110, 110' by valves 128, 128' for each turbine 100, 100' is input into the system. This measured amount of coolant flow and the adjusted coolant flow set point from 320, 320' are input into a second PID controller at 328, 328' for each turbine. At 328, 328' the PID controller generates a percent error signal.

The percent error output at 328, 328' is used to control the demand on the coolant injection throttle valves at 330, 330'. Where the adjusted coolant flow set point at 320, 320' is greater than the actual flow level of coolant at 326, 326', the NOx measured is greater than the NOx set point. Accordingly, the percent error signal output at 328, 328' provides for a percent increase in that amount in the demand on the throttle valve, such that more coolant is injected into the combustor in order to reduce the level of NOx emissions. Where, the adjusted coolant flow set point at 320, 320' is less than the actual flow level of coolant at 326, 326', the NOx measured is below the NOx set point value, and the error signal provides for a decrease in the demand on the throttle valve. Although actual NOx emission levels below the set point is a desirable situation, the demand on the throttle valve will be decreased by the percentage in order to reduce any unnecessary mass flow throughout the turbine. Thus, the control system in accordance with the present invention provides for control of the NOx levels produced by the turbine, while providing for maximized turbine cycle efficiency.

Control of the flow of coolant injected into combustor 110 in accordance with the present invention is not limited to percentage bias control. Accordingly, control wherein the range of error in the standard load versus flow curve is non-constant over the range of operational load of the gas turbine is within the scope of this invention.

Although particular embodiments of the present invention have been described and illustrated herein, it is recognized that modifications and variations may readily occur to those skilled in the art. Consequently, it is intended that the claims be intended to cover such modifications and equivalents.

What is claimed is:

1. A gas turbine power plant having at least one gas turbine, said at least one gas turbine having at least one combustor, said power plant further having a system for controlling the flow of coolant injected into said at least one combustor and for measuring the amount of coolant flow, comprising:
    sensing means for measuring the amount of NOx emissions produced by said at least one gas turbine;
    first controller means for generating a first signal indicative of the percent error between an NOx emissions set point and said measured amount of NOx emissions;
    second controller means for generating a second signal indicative of the percent error between an adjusted coolant flow set point and said measured amount of coolant flow, said second controller means being responsive to said first signal to adjust said coolant flow set point; and
    injecting means for injecting said flow of coolant into said combustor, said injecting means responsive to said second signal.

2. The gas turbine power plant of claim 1, further having one emissions stack, said power plant having two gas turbines, said two gas turbines connected to said emissions stack, said sensing means operatively located within said emissions stack.

3. The gas turbine power plant of claim 1, wherein said first controller means is a PID controller.

4. The gas turbine power plant of claim 3, wherein said PID controller generates a percent error between about and about +100%.

5. The gas turbine power plant of claim 1, wherein said second controller means is a PID controller.

6. The gas turbine power plant of claim 5, wherein said PID controller generates a percent error between about −100% and about +100%.

7. In a gas turbine power plant having at least one gas turbine, each said gas turbine having at least one combustor, a method for controlling the flow of coolant injected into each said combustor, comprising the steps of:
    generating a first signal indicative of the percent error between an NOx emissions set point and the measured amount of NOx emissions produced by said power plant;
    adjusting a predetermined coolant flow set point in accordance with said first signal and producing therefrom a parameter indicative thereof;
    measuring the amount of coolant flow;
    generating a second signal indicative of the percent error between said parameter and the measured amount of coolant flow; and
    controlling said flow of coolant in accordance with said second signal.

8. A method in accordance with claim 7, wherein said first signal is generated by a PID controller.

9. A method in accordance with claim 8, wherein said PID controller generates a percent error between about −100% and +100%.

10. A method in accordance with claim 7, wherein said predetermined coolant flow set point is adjusted by multiplying said first signal by said coolant flow set point and producing a third signal indicative of said multiplication and adding said third signal to said coolant flow set point.

11. A method in accordance with claim 7, wherein said adjustment to said predetermined coolant flow set point is limited to a predetermined percentage change in said coolant flow set point.

12. A method in accordance with claim 11, wherein said percentage change is ±10% of said coolant flow set point.

13. A method in accordance with claim 7, wherein said second signal is generated by a PID controller.

14. A method in accordance with claim 13, wherein said PID controller generates a percent error between about −100% and +100%.

* * * * *